(12) United States Patent
Sommer et al.

(10) Patent No.: US 7,753,424 B2
(45) Date of Patent: Jul. 13, 2010

(54) ARMREST ARRANGEMENT FOR A MOTOR VEHICLE DOOR

(75) Inventors: Uwe Sommer, Effelder (DE); Manfred Stenzel, Bamberg (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 355 days.

(21) Appl. No.: 11/847,266

(22) Filed: Aug. 29, 2007

(65) Prior Publication Data

US 2008/0054676 A1 Mar. 6, 2008

(30) Foreign Application Priority Data

Aug. 31, 2006 (DE) .................. 20 2006 013 584 U
Jun. 26, 2007 (DE) ...................... 10 2007 030 045

(51) Int. Cl.
*B60N 2/46* (2006.01)
(52) U.S. Cl. ...................................... 296/1.09; 296/153
(58) Field of Classification Search ................ 296/1.09, 296/153; 297/115, 411.2, 411.21, 411.22, 297/411.35–38; 248/118, 118.3, 118.5
See application file for complete search history.

(56) References Cited

U.S. PATENT DOCUMENTS

| RE19,721 | E | * | 10/1935 | Genung | 297/411.21 |
|---|---|---|---|---|---|
| 2,325,292 | A | * | 7/1943 | Westrope | 297/411.21 |
| 2,760,813 | A | * | 8/1956 | Colm | 296/68.1 |
| 4,619,478 | A | * | 10/1986 | Heimnick et al. | 296/153 |
| 4,659,135 | A | * | 4/1987 | Johnson | 296/153 |
| 6,905,163 | B2 | * | 6/2005 | Bornchen et al. | 296/153 |
| 2006/0163933 | A1 | * | 7/2006 | Radu et al. | 297/411.35 |
| 2007/0080560 | A1 | | 4/2007 | Sommer et al. | |
| 2008/0012415 | A1 | * | 1/2008 | Becker et al. | 297/411.21 |

FOREIGN PATENT DOCUMENTS

| DE | 3930270 | A | * | 3/1991 |
|---|---|---|---|---|
| DE | 4002243 | A | * | 8/1991 |
| DE | 101 04 077 | A1 | | 8/2002 |

(Continued)

OTHER PUBLICATIONS

German Search Report dated Feb. 22, 2008 for Application No. 20 2006 013 584.7, 4 pages.

(Continued)

*Primary Examiner*—H Gutman
(74) *Attorney, Agent, or Firm*—Christie, Parker & Hale LLP

(57) ABSTRACT

An armrest arrangement for a motor vehicle door includes an armrest which is adjustable in a direction of adjustment, a guide device, at least one slide movably guided on the guide device in the direction of adjustment, at least one coupling element, via which the armrest is connected to the slide, a locking mechanism, by which the armrest is lockable in a previously set position of adjustment along the guide device, and a door lining, which extends two-dimensionally between the slide and the armrest and which is penetrated by the at least one coupling element. The locking mechanism is unlockable by a movement of the armrest in an unlocking direction. The armrest is mounted such that an unlocking movement of the armrest is coupled in the unlocking direction to a second movement by which the armrest is moved away from the door lining.

35 Claims, 6 Drawing Sheets

FOREIGN PATENT DOCUMENTS

| | | | |
|---|---|---|---|
| DE | 202 01 105 U1 | | 10/2002 |
| DE | 201 20 958 U1 | | 4/2003 |
| DE | 102 35 350 A1 | | 2/2004 |
| DE | 103 07 481 A1 | | 9/2004 |
| DE | 10 2005 043 063 A1 | | 3/2007 |
| EP | 1048517 A1 | * | 11/2000 |
| EP | 1676743 A1 | * | 7/2006 |
| FR | 2691414 A1 | * | 11/1993 |
| JP | 6101244 A | * | 1/1986 |
| JP | 2005225456 A | * | 8/2005 |
| JP | 2006152780 A | * | 6/2006 |
| WO | WO 02/060721 A3 | | 8/2002 |

OTHER PUBLICATIONS

German Search Report dated Apr. 18, 2008 for Application No. 10 2007 030 045.1, 4 pages.

* cited by examiner

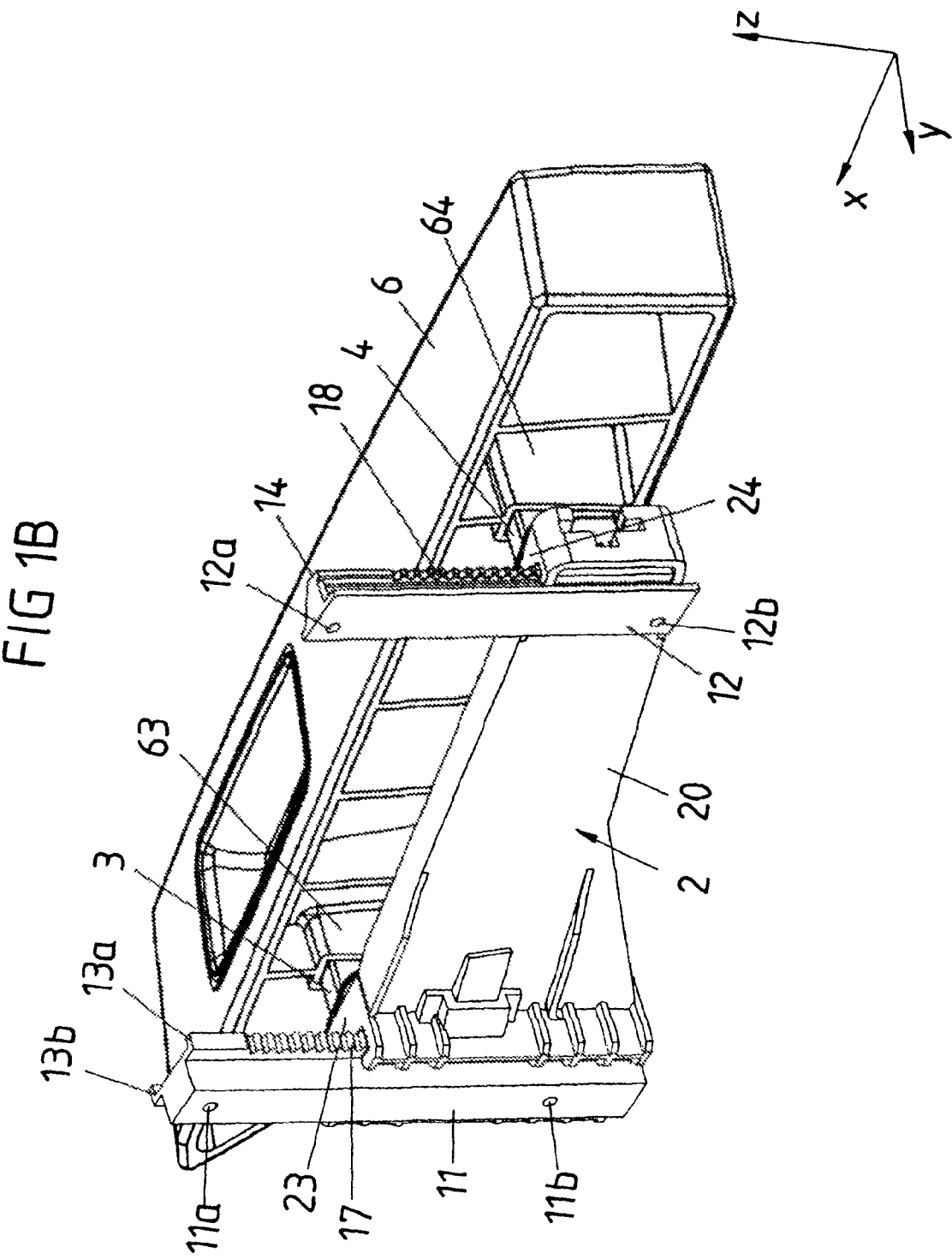

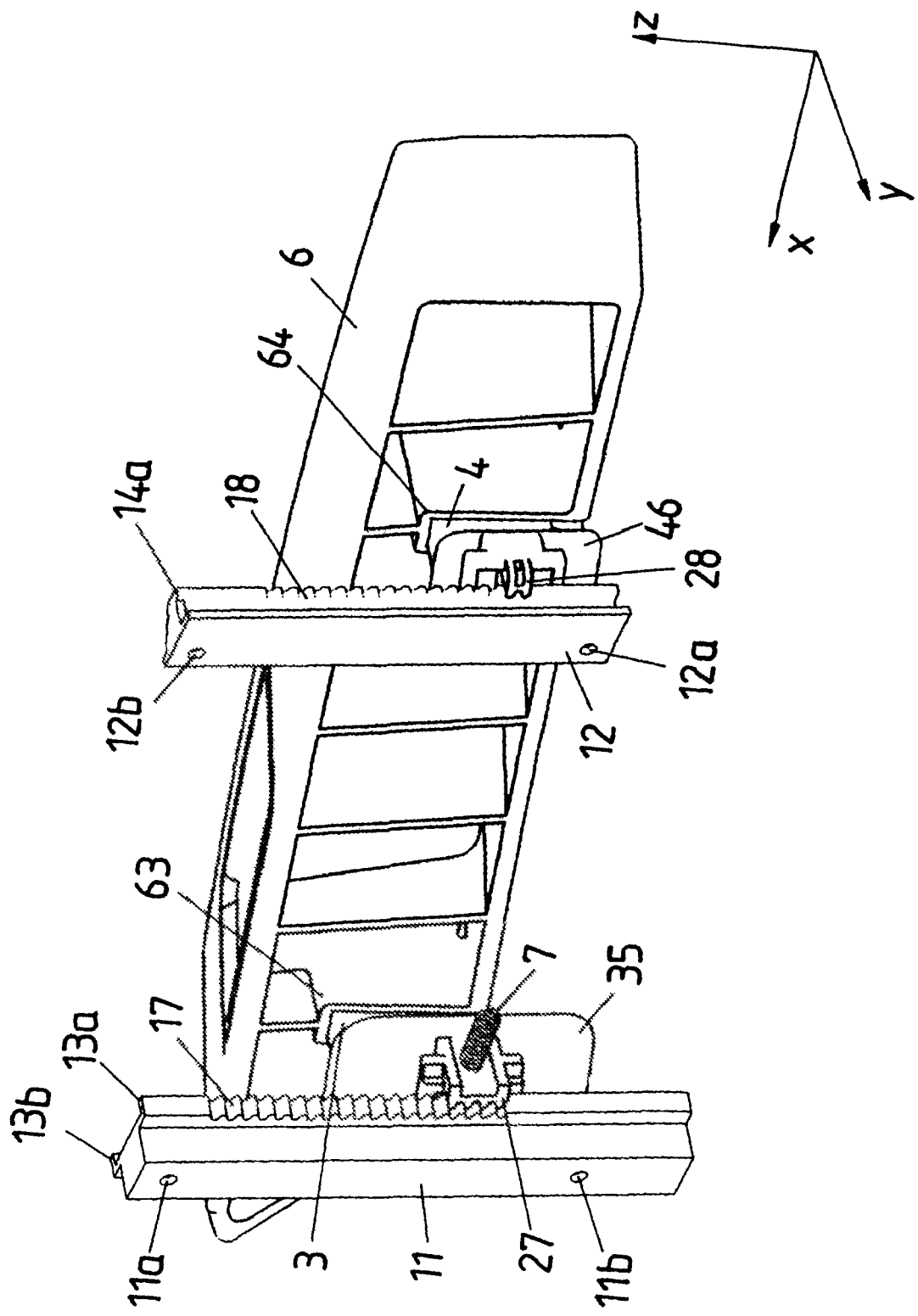

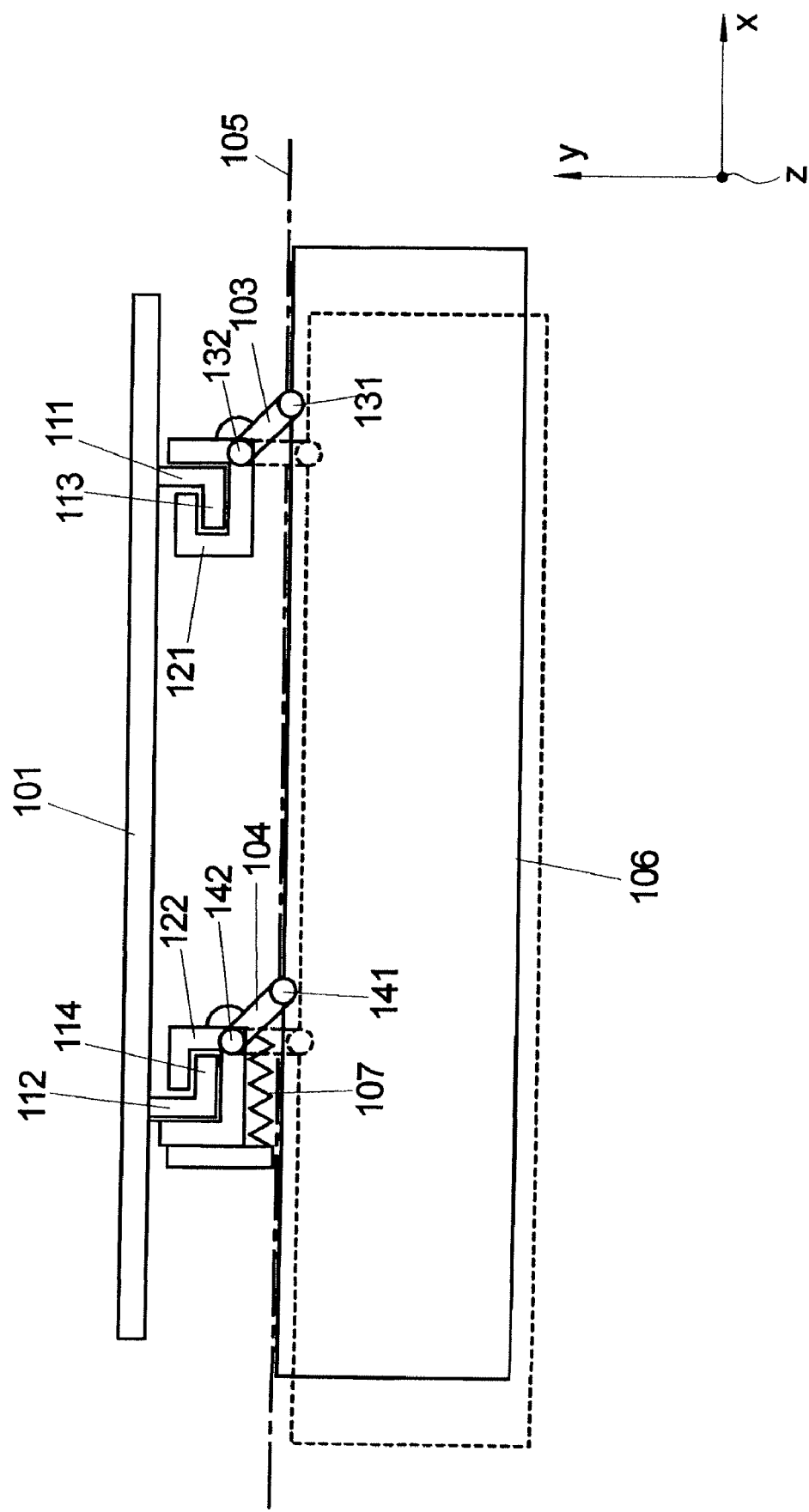

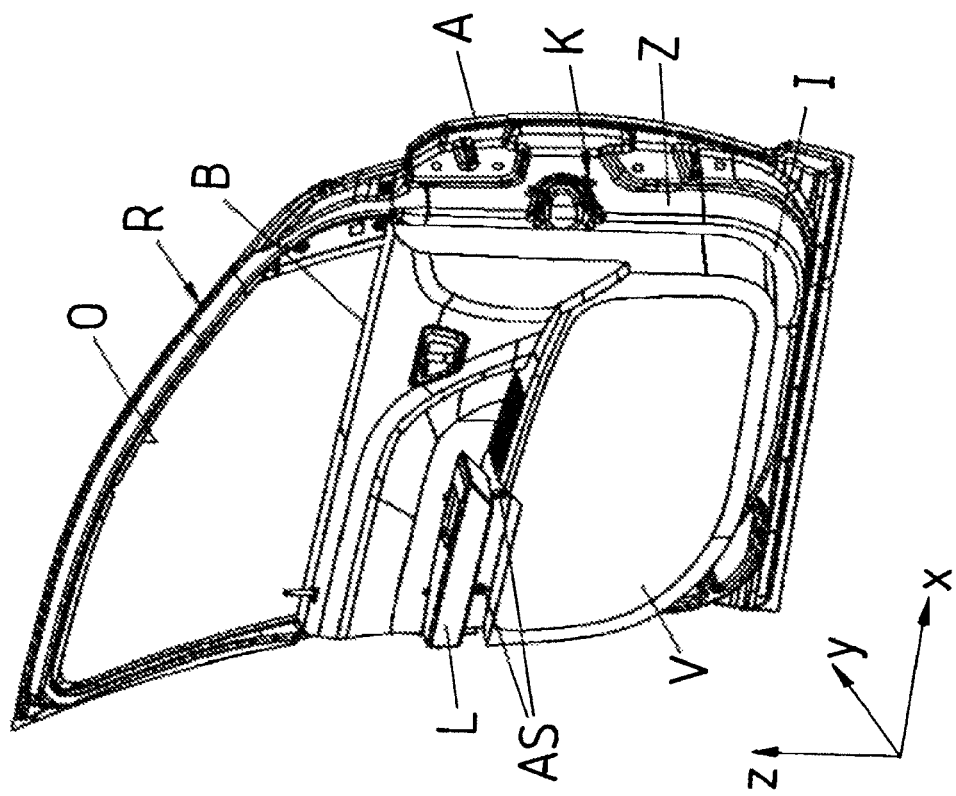
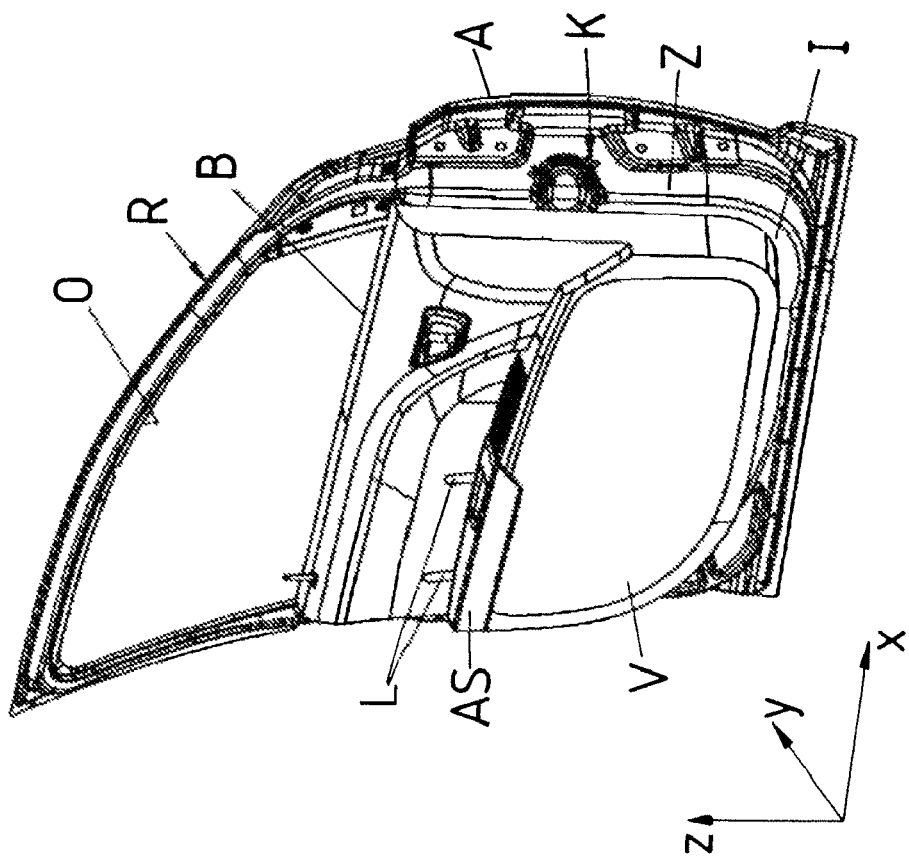

ARMREST ARRANGEMENT FOR A MOTOR VEHICLE DOOR

CROSS-REFERENCE TO RELATED APPLICATIONS

This application claims priority of German Utility Model Application No. 20 2006 013 584.7 filed 31 Aug. 2006 and German Patent Application No. 10 2007 030 045.1 filed 26 Jun. 2007, which are hereby incorporated by reference.

BACKGROUND

The invention relates to an armrest arrangement for a motor vehicle door.

Such an armrest arrangement comprises an armrest which is adjustable in a direction of adjustment (which is possibly location-dependent and thus spatially varying); a guide device extending in the direction of adjustment to be arranged on a motor vehicle door; at least one slide movably guided on the guide device in the direction of adjustment; at least one coupling element, via which the armrest is connected to the at least one slide, so that with an adjusting movement of the slide along the guide device, the armrest is driven along in the direction of adjustment; a locking mechanism, by which the armrest may be locked in a previously set position of adjustment along the guide device; and a door lining, which extends two-dimensionally between the slide and the armrest (so that the slide is not visible from the vehicle interior, in the installed state of the armrest arrangement in a motor vehicle) and which is penetrated by the at least one coupling element.

By means of such an armrest arrangement, the position of adjustment of the armrest may be adjusted in the direction of adjustment, by the locking mechanism associated with the armrest being unlocked by a movement of the armrest in an unlocking direction. In the unlocked state of the locking mechanism, the armrest may then be displaced along the guide device into a new position of adjustment. When reaching the desired position of adjustment, the locking mechanism is then locked again, so that the armrest remains in the previously set locked position, which is adapted to the current user of the armrest as a comfort position.

The locking mechanism of the armrest arrangement is thus typically pretensioned in the direction of the locked state by means of a resilient element, so that the armrest has to be actively transferred by the action of force in the unlocking direction from the locked state into the unlocked state. The armrest remains in the unlocked state as long as a force acts thereon in the unlocking direction. During this time, the armrest may be moved in the direction of adjustment into a new position of adjustment.

For ergonomic reasons, the unlocking of the armrest and/or more specifically of the locking mechanism is generally carried out by the action of force on the armrest parallel to the surface (door plane) spanned by the planar door lining, the unlocking direction being different from the direction of adjustment of the armrest. Thus the unlocking direction extends—relative to the installed state of the armrest arrangement in a motor vehicle—generally along the vehicle longitudinal axis (i.e. the forward direction of travel).

For visual reasons, namely for optimizing the design of the armrest arrangement on the interior side, the armrest is positioned as tightly as possible against the door lining transversely to the door plane—i.e. viewed along the horizontal vehicle transverse axis. This may, however, even at low tolerances, lead to the fact that with an adjusting movement of the armrest in the direction of adjustment, the armrest scrapes against the door lining which leads to wear and tear and unpleasant noise.

SUMMARY

The object of the invention, therefore, is to improve an armrest arrangement of the aforementioned type with regard to an adjustability of the armrest without wear and tear.

According to the invention the armrest is mounted such that an unlocking movement of the armrest in the unlocking direction is coupled to a second movement, by means of which the armrest is moved away from the door lining.

As a result, scraping of the armrest against the door lining is avoided during a subsequent adjusting movement of the armrest in the direction of adjustment.

The second movement is thus preferably in a manner such that all regions of the armrest are moved away as uniformly as possible from the door lining, namely in the manner of a parallel displacement.

According to one embodiment of the invention, the second movement of the armrest is carried out at the same time as the unlocking movement, i.e. said unlocking movement is overlaid. However, it may also be provided that the second movement of the armrest is carried out before or after the unlocking movement.

In this connection, preferably a forced coupling is provided of the unlocking movement and the second movement of the armrest, so that when triggering one of said two movements—as claimed in which of the two movements is intended to be triggered first, as claimed in requirements—the respective other movement is also (simultaneously or subsequently) forcibly triggered.

The unlocking movement of the armrest is preferably carried out along the door plane, i.e. along the plane along which the armrest is also moved during an adjusting movement (substantially parallel to the door inner skin and/or door lining of a motor vehicle door). In this case, the movement is a longitudinal movement or a pivoting movement along the door plane and/or a combination of such movements.

According to an exemplary embodiment of the invention, the armrest is mounted by means of the at least one coupling element as well as the at least one slide, such that with the action of force on the armrest along the unlocking device, the unlocking movement of the armrest in the unlocking direction is overlaid by a second movement, by means of which the armrest is moved transversely to the surface along which the door lining extends, away from the door lining.

In order to allow the unlocking of the locking mechanism and thus of the armrest, on the one hand, the at least one coupling element, via which the armrest is coupled to the at least one slide of the armrest arrangement, may be movably mounted in the unlocking direction on the associated slide. Alternatively, the at least one slide may itself be movably mounted in the unlocking direction on the guide device of the armrest arrangement. In both cases, the element which is movable in the unlocking direction, i.e. the coupling element or the slide, is preferably pretensioned by means of a resilient element into a position which corresponds to the locked state of the locking mechanism and thus has to be transferred, counter to the resilient pretensioning in the unlocking direction, into a position which corresponds to the unlocked state of the locking mechanism. This takes place by a corresponding action of force on the armrest.

Exemplary, the movement in the unlocking direction (unlocking movement) is a longitudinal movement, so that the respective element to be moved in the unlocking direction is displaced in said direction. To this end, a longitudinal guide may be provided, by means of which the armrest is movably mounted in the unlocking direction, the longitudinal guide being able to be configured, on the one hand, between the at least one coupling element and the at least one associated slide or, on the other hand, between the at least one slide and the associated guide device.

Said longitudinal guide may, as claimed in the invention, be configured as an oblique guide, which extends inclined to the surface in which the door lining extends (door plane), so that a movement of the armrest in the unlocking direction is always overlaid by a movement transversely to the surface spanned by the door lining. Thus the oblique guide comprises, as such, both a guide component along the surface spanned by the door lining and a component perpendicular to said surface.

According to an exemplary embodiment of the invention, a lever arrangement is provided by means of which the armrest may be moved in the unlocking direction. Said lever arrangement may be formed, for example, from at least two pivotably mounted articulated levers, by the simultaneous pivoting thereof, the armrest being moved in the unlocking direction. With such a displacement of the armrest by means of a lever arrangement, a movement of the armrest is carried out simultaneously transversely to said direction of displacement, i.e. with a suitable arrangement of the articulated levers, in particular transversely to the surface (door plane) spanned by the door lining.

The at least two articulated levers may, therefore, form one respective coupling element via which the armrest is coupled to the at least one slide, by the two articulated levers being pivotably articulated via one respective joint, on the one hand, to the armrest and, on the other hand, to the associated slide.

According to an exemplary embodiment of the invention, just one slide is provided which is movable along the guide device, to which at least two coupling elements are associated which at different points respectively couple the armrest arrangement to the slide. According to a further embodiment of the invention, a suitable slide is associated with each of the coupling elements.

The guide device preferably comprises two guide rails, which extend respectively in the direction of adjustment of the armrest, and are spaced apart from one another transversely to the direction of adjustment. In the case where just one of the slides provided on the guide device is provided, said slide movably engages in both guide rails in the direction of adjustment. In the other case, a suitable slide is associated with each of the two guide rails and which is movably mounted respectively in the direction of adjustment on the associated guide rail.

The locking mechanism is designed such that, by a movement of at least one coupling element and/or at least one slide in the unlocking direction, locking elements associated with one another on the coupling element and/or slide, on the one hand, and on the guide device, on the other hand, are brought out of engagement, see DE 10 2005 043 063.

In this case, the locking mechanism is preferably pretensioned by means of a resilient element in the direction of the locked state, so that the unlocking takes place by active force action on the armrest in the unlocking direction, the coupling element and/or the slide being driven along.

So that the coupling elements penetrating the door lining do not hinder the movement of the armrest arrangement in the direction of adjustment, slots extending in the longitudinal direction are provided in the door lining, in which the coupling elements are guided and which allow a movement of the coupling elements in the direction of adjustment. The coupling elements may, in turn, carry cover plates which cover the longitudinal slots such that they are not visible from the vehicle interior—relative to the installed state of the armrest arrangement.

BRIEF DESCRIPTION OF THE DRAWINGS

Further details and advantages of the invention will become clear in the following description of an embodiment, with reference to the figures, in which:

FIG. 1B shows a perspective rear view of the armrest arrangement of FIG. 1A without the supporting door component and the door lining.

FIG. 1C shows a perspective rear view as claimed in FIG. 1B without a part of a slide, via which the armrest is displaceably guided in the direction of adjustment on a guide device.

FIG. 3 shows a modification of the armrest arrangement of FIG. 1A in cross section.

FIG. 4A shows a perspective view of a motor vehicle door with a height-adjustable armrest in a lower position of adjustment.

FIG. 4B shows the motor vehicle door of FIG. 4A with the height-adjustable armrest in an upper position.

DETAILED DESCRIPTION

FIG. 4A shows in a perspective view a motor vehicle door comprising a door casing K, formed by a door inner skin I and a door outer skin A which are connected to one another by a connecting frame or subframe Z and which enclose therebetween a cavity, upwardly defined by the door parapet B (i.e. along the vertical vehicle axis z). Above the door parapet B a window frame R extends which defines and, together with the door parapet B, encloses a window aperture O.

The door inner skin I may be of multi-part configuration and, for example, have a large-surfaced cutout which is covered by a supporting door component in the form of an assembly support. Different functional components of a motor vehicle door may, in turn, be preassembled on said assembly support and, together with the assembly support, installed as a door module in the motor vehicle door.

The door inner skin I toward the vehicle interior is, in turn, covered by a door lining V on which a height-adjustable armrest AS is arranged on the interior side. The armrest AS is coupled to a guide device through longitudinal slots L in the door lining V, by which the armrest may be displaced in its direction of adjustment, i.e. in the present case substantially parallel to the vertical vehicle axis z. The guide device is located behind the door lining V—viewed from the vehicle interior—and is arranged on the door inner skin and/or on an assembly support incorporated in the door inner skin.

FIG. 4B shows the motor vehicle door of FIG. 4A with an armrest AS, which has been transferred from the lower position of adjustment shown in FIG. 4A, into an upper position of adjustment. In this connection, it is significant that the armrest AS scrapes as little as possible against the door lining V during an adjusting movement from the state shown in FIG. 4A into the state shown in FIG. 4B and wears out said door lining as little as possible. On the other hand, the armrest AS is intended to be positioned as tightly as possible against the door lining V—along the horizontal vehicle transverse axis y—in order to avoid the formation of gaps which would impair the design. An armrest arrangement, by means of which said requirements may be fulfilled, is subsequently described in more detail in two different embodiments with reference to FIGS. 1A to 3.

Figure 1A:
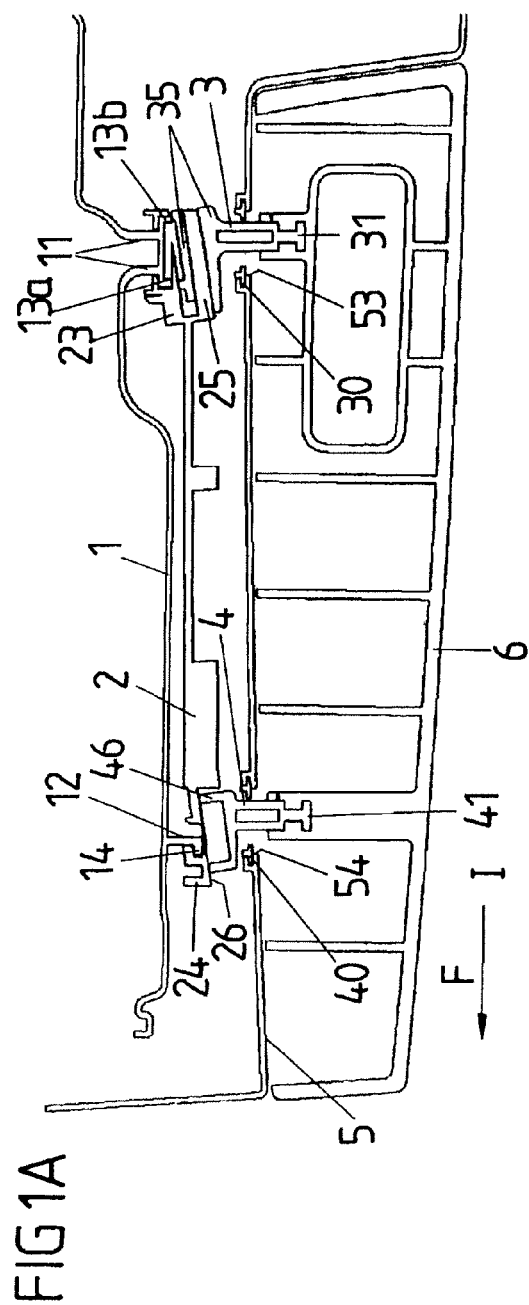
FIG. 1A shows a cross section through an armrest arrangement for a motor vehicle door with a height-adjustable armrest in the locked state as well as a supporting door component and a door lining.

FIG. 1A shows a cross section through an armrest arrangement for a motor vehicle door. Said armrest arrangement is arranged on a supporting part 1 of the door structure, which in particular may be a component of the door inner skin of a door structure. In the present case, the supporting door component 1 is a so-called assembly support on which different functional components of a motor vehicle door, such as for example a lock assembly, a window lifter, a loudspeaker system as well as components of an armrest arrangement may be preassembled, before the assembly support, together with the functional components preassembled thereon, is installed as a completely prefabricated and preferably also pre-tested door module in a motor vehicle door. The installation is carried out, for example, such that the assembly support 1 in the installed state covers a large-surfaced cutout of the door inner skin of the motor vehicle door and thus on the edge of said cutout bears against the door inner skin and is fastened thereto.

The assembly support 1 extends in the installed state in the so-called door plane of a motor vehicle, which is spanned by the vehicle longitudinal axis x extending in the forward direction of travel as well as the vertical vehicle axis z extending in the direction of the vehicle roof (xz plane).

Two guide rails 11, 12 are formed on the assembly support 1 which respectively extend substantially along the vertical vehicle axis z and which have two bent end portions 13a, 13b and/or a bent end portion 14. The guide rails 11, 12 are spaced apart from one another transversely to their direction of extension z, namely along the vehicle longitudinal axis x, and extend substantially parallel to one another. Alternatively, the two guide rails 11, 12 may also be fastened as separate (and not integrally formed) components on an assembly support, as is indicated in FIGS. 1B to 1D with reference to the fastening openings 11a, 11b; 12a, 12b provided in the guide rails 11, 12, via which the guide rails 11, 12 may be fastened to an assembly support.

Figure 1D:
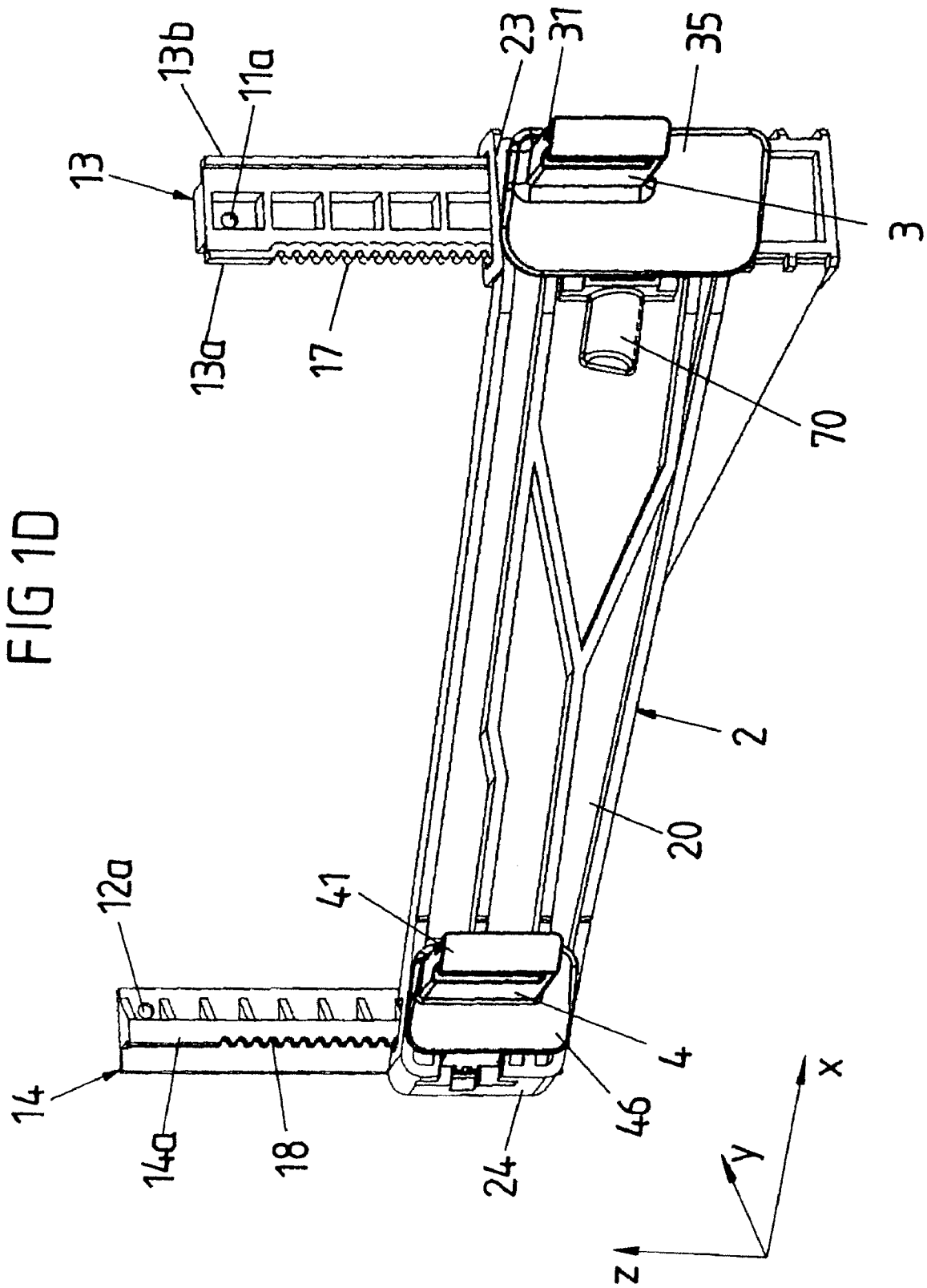
FIG. 1D shows a perspective front view of the arrangement of FIG. 1A without the supporting door component and the door lining as well as without the armrest body.

The two guide rails 11, 12 which are also shown in the enlarged perspective views as claimed in FIGS. 1B, 1C and 1D, form a guide device by means of which an al armrest 6 may be adjusted heightwise along the vertical vehicle axis z (direction of adjustment) heightwise. To this end, a slide 2 engages with one respective slide portion 23 and/or 24 in the two guide rails 11, 12 such that each of the two slide portions 23 and/or 24 engages around the bent end portions 13a, 13b and/or 14 provided on the associated guide rail 11 and/or 12. The slide 2 is, as a result, movably (displaceably) guided on the guide rails 11, 12 along the vertical vehicle axis z forming the direction of adjustment of the armrest 6.

Two coupling elements 3, 4 in the form of drive elements, which are respectively connected, on the one hand, with the slide 2 and, on the other hand, with an end portion 31 and/or 41 to the armrest 6, serve to connect the slide 2, which is movable in the direction of adjustment z of the armrest 6, to said armrest 6, so that the armrest 6 is driven along in the direction of adjustment z by a movement (displacement) of the slide 2. To this end, a connecting region 63, 64 is associated with each of the coupling elements 3, 4 on the armrest 6, into which one respective coupling element 3, 4 engages with its end portion 31, 41 for creating a connection with the armrest 6. On the armrest side, a fixed, rigid connection with the associated end portions 31, 41 of the coupling elements 3, 4 is present. On the slide side, the two coupling elements 3, 4 are respectively guided with a guide region 35 and/or 46 on an associated longitudinal guide 25 and/or 26 of the slide 2, so that the coupling elements 3, 4 may be displaced in a defined manner relative to the respectively associated slide portion 23 and/or 24. The two longitudinal guides 25 and/or 26 of the slide 2 are connected to one another via a longitudinally extended main body 20 of the slide 2.

The longitudinal guides 25, 26 in which the coupling elements 3, 4 are displaceably guided in a defined manner with their guide portions 35, 46, are thus located in the region of one of the two guide rails 11, 12.

A door lining 5 extends between the slide 2 and the armrest 6 and which covers the assembly support 1 as well as the slide 2 toward the vehicle interior I, and which is generally adapted to the design of the further regions of the vehicle interior I.

The door lining 5 comprises two longitudinal slots 53, 54 extending in the direction of adjustment z of the armrest 6, through which the two coupling elements 3, 4 project and in which the two coupling elements 3, 4 are movable in the direction of adjustment z, when the slide 2 is displaced on the guide rails 11, 12 in the direction of adjustment z, in order to raise or lower the armrest 6 in the direction of adjustment z.

In the region of the two longitudinal slots 53, 54, two cover plates 30, 40 are guided on the door lining 5, which, together with the coupling elements 3, 4 may be moved in the direction of adjustment z, and which cover the regions of one respective longitudinal slot 53, 54 not covered by the armrest 6 in one respective position of adjustment, so that said slot is not visible from the vehicle interior I.

FIGS. 1A to 1D show the armrest 6 in a state in which it is locked in a specific position of adjustment (set position in the direction of adjustment z). To this end, on each of the two guide rails 11, 12 of the armrest arrangement, a locking region 17 and/or 18 extending in the direction of adjustment z is configured, which defines a plurality of locking points in the form of positive connection points arranged one after the other in the direction of adjustment z, as longitudinal toothing. The slide 2 engages therein with two locking elements 27, 28 which are arranged on the main body 20 of the slide 2 respectively in the region of one of the longitudinal guides 25 and 26 on the slide side. Alternatively, the locking regions 17, 18 may also be configured and arranged independently of the guide rails 11, 12; and similarly, the associated locking elements 27, 28 on the armrest side may be connected to the armrest 6 separately from the slide 2.

The locking elements 27, 28 are thus resiliently pretensioned in the locked state, by means of a resilient element 7 arranged in a pocket 70 in the form of a compression spring, in which said locking elements engage positively in the associated longitudinally extended locking regions 17, 18.

For unlocking the locking mechanism counter to the pretensioning, which holds the locking mechanism in the locked state shown in FIGS. 1A to 1D, a force F has to be exerted on the armrest 6 to the rear (counter to the direction of travel) along the vehicle longitudinal axis x (parallel to the extension plane of the assembly support 1 and the door lining 5). As a result, the two coupling elements 3, 4 are moved in said direction x (unlocking movement), the locking elements on the coupling element side being disengaged from the locking means on the guide rail side, so that the armrest 6 is unlocked and may be raised or lowered in the direction of adjustment z.

The movement of the coupling elements 3, 4 is carried out, therefore, along the associated longitudinal guides 25, 26 on the slide side, into which the coupling elements 3, 4 engage with one respective guide portion 35 and/or 46. The two longitudinal guides 25, 26 are oriented inclined relative to the door plane (xz plane), along which the assembly support 1 as well as the door inner skin 5 extend. As a result, the respective longitudinal guide 25, 26 not only comprises a component in the unlocking direction x (vehicle longitudinal direction) but also a component along the horizontal vehicle transverse axis y extending perpendicular to the door plane. This means that, with an unlocking movement of the armrest 6 in the vehicle longitudinal direction x, as claimed in the transition from FIG. 1A to FIG. 2, a movement of the armrest 6 also takes place simultaneously along the horizontal vehicle transverse axis y away from the door lining 5.

Figure 2:
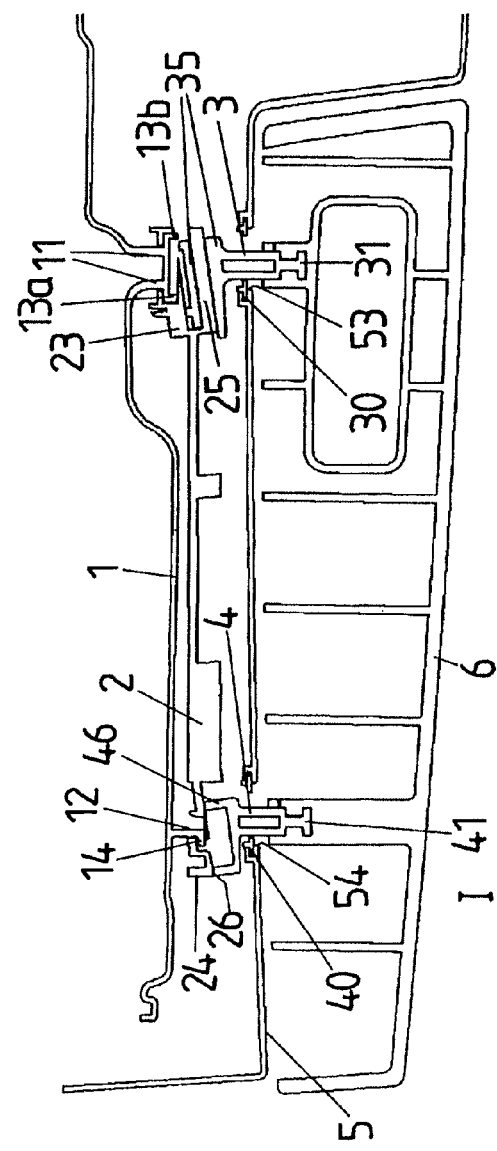
FIG. 2 shows the armrest arrangement of FIG. 1A in the unlocked state.

As a result, in the unlocked state, shown in FIG. 2, the armrest 6 is located at a greater distance from the door lining 5 (along the horizontal vehicle transverse axis y perpendicular to the door plane xz) than a locked state shown in FIG. 1A.

In the locked state as claimed in FIGS. 1A to 1D, the armrest may, therefore, be positioned so tightly against the door lining 5 that no gaps visible from the vehicle interior, and possibly perceived as offending, are formed between the armrest 6 and the door lining 5.

In the unlocked state, in which the armrest 6 is intended to be displaced in the direction of adjustment z, in order to set a new position of adjustment, the armrest 6 is, in contrast, removed sufficiently far from the door lining 5 along the horizontal vehicle transverse axis y, in order to avoid scraping of the armrest 6 on the door lining 5.

FIG. 3 shows a modification of the embodiment of FIGS. 1A to 1D and 2, in this case two guide rails 111, 112 extending in the direction of adjustment z and spaced apart from one another transversely to the direction of adjustment z, also being formed on a supporting motor vehicle part 101, for example in the form of an assembly support, and which in this case comprise a bent (end) portion 113 and/or 114.

In the present case, an individual slide 121, 122 is associated with each of the two guide rails 111, 112, which engages around the respective guide rail 111 or 112 on the bent portion 113 and/or 114. Each of the two slides 121, 122 is connected to the armrest 106 to be adjusted via a coupling element 103 and/or 104 in the form of an articulated lever. The two articulated levers 103, 104 are respectively pivotably articulated to the armrest 106 by a first joint 131 and/or 141 and pivotably articulated to the associated slide 121 and/or 122 by a second joint 132 and/or 142.

The two articulated levers 103, 104 form a so-called parallelogram adjustment which, with an introduction of force into the armrest 6 parallel to the unlocking direction x (vehicle longitudinal axis), causes a movement of the armrest 6, 106 in said direction x, the two articulated levers 103, 104 being respectively pivoted about their two joints 131, 132 and/or 141, 142. The unlocking movement in the unlocking direction x is overlaid by a movement of the armrest 6 transversely to the plane spanned by the assembly support 101 and/or the door lining 105 (only shown schematically here), i.e. along the horizontal vehicle transverse axis y, away from the door lining 105.

The unlocking of the armrest 106 takes place, therefore, counter to the action of at least one resilient element 107 which has the tendency to pretension at least one of the coupling elements 103, 104 in the direction of the position in which the locking elements on the coupling element side engage in the locking elements on the guide rail side.

For locking the armrest 106 in a previously set position of adjustment, for reasons of improved clarity, the view of a locking mechanism has been omitted in FIG. 3. To this end, for example, a locking mechanism of the type shown with reference to FIGS. 1B to 1D may be used.

The position of the coupling elements 103, 104, as well as the armrest 106, after the transition into the unlocked state, is shown in dotted lines in FIG. 3. It is clearly visible that the armrest 106 in the unlocked state is at a greater distance from the supporting motor vehicle part 101 and thus also a door lining 105 arranged in front, than in the locked state—shown by continuous lines.

What is claimed is:

1. An armrest arrangement for a motor vehicle door, the armrest arrangement comprising:
    an armrest being adjustable in a direction of adjustment;
    a guide device extending in the direction of adjustment;
    at least one slide movably guided on the guide device in the direction of adjustment;
    at least one coupling element connecting the armrest to the slide, wherein the armrest is movably mounted on the guide device via the coupling element and the slide and, wherein with an adjusting movement of the slide along the guide device, the armrest is driven along in the direction of adjustment;
    a locking mechanism configured to lock the armrest in a previously set position of adjustment along the guide device; and
    a door lining extending two-dimensionally between the slide and the armrest and wherein the door lining is penetrated by the at least one coupling element;
    wherein the locking mechanism is unlockable by a movement of the armrest in an unlocking direction; and
    wherein the armrest is mounted such that an unlocking movement of the armrest in the unlocking direction is coupled to a second movement wherein the armrest is moved away from the door lining with the second movement of the armrest.

2. The armrest arrangement of claim 1, wherein the second movement of the armrest is forcibly coupled to the unlocking movement.

3. The armrest arrangement of claim 1 or 2, wherein the second movement of the armrest is carried out together with the unlocking movement and said unlocking movement is simultaneous with the second movement.

4. The armrest arrangement of claim 1 or 2, wherein the second movement of the armrest takes place before the unlocking movement.

5. The armrest arrangement of claim 1 or 2, wherein the second movement of the armrest takes place after the unlocking movement.

6. The armrest arrangement of claim 1, wherein the second movement of the armrest is oriented in a direction away from the door lining and transversely to a surface along which the door lining extends.

7. The armrest arrangement of claim 1, wherein the unlocking movement of the armrest is configured to be triggered by the action of force on the armrest in the unlocking direction, and wherein the unlocking movement of the armrest is simultaneous with the second movement, wherein the armrest is moved away from the door lining with the second movement of the armrest.

8. The armrest arrangement of claim 1, wherein the at least one coupling element is movably mounted in the unlocking direction on the at least one slide.

9. The armrest arrangement of claim 8, wherein the at least one coupling element is displaceably mounted in the unlocking direction on the at least one slide.

10. The armrest arrangement of claim 1, wherein the at least one slide is movably mounted in the unlocking direction on the guide device.

11. The armrest arrangement of claim 10, wherein the at least one slide is displaceably mounted in the unlocking direction on the guide device.

12. The armrest arrangement of claim 1, wherein the armrest is displaceable for unlocking the locking mechanism in the unlocking direction.

13. The armrest arrangement of claim 1, wherein the unlocking direction extends substantially parallel to a surface spanned by the door lining.

14. The armrest arrangement of claim 1, wherein the unlocking direction extends substantially along a vehicle longitudinal axis.

15. The armrest arrangement of claim 1, wherein the unlocking direction extends substantially perpendicular to the direction of adjustment of the armrest.

16. The armrest arrangement of claim 1, further comprising at least one longitudinal guide, wherein the armrest is movably mounted in the unlocking direction with the at least one longitudinal guide.

17. The armrest arrangement of claim 16, wherein the at least one coupling element is displaceably mounted with the longitudinal guide in the unlocking direction on the at least one slide.

18. The armrest arrangement of claim 16, wherein the longitudinal guide is configured as an oblique guide extending inclined to a surface along which the door lining extends, wherein the unlocking movement of the armrest in the unlocking direction is simultaneous with a movement in a direction transversely to the surface along which the door lining extends.

19. The armrest arrangement of claim 1, further comprising a lever arrangement, wherein the armrest is movably mounted in the unlocking direction with the lever arrangement.

20. The armrest arrangement of claim 19, wherein the lever arrangement comprises two pivotably mounted articulated levers, wherein the simultaneous pivoting of the levers moves the armrest in the unlocking direction.

21. The armrest arrangement of claim 20, wherein the two articulated levers form one respective coupling element via which the armrest is coupled to the at least one slide.

22. The armrest arrangement of claim 21, wherein the two articulated levers are articulated via one respective joint to the armrest and via one respective other joint to the at least one slide.

23. The armrest arrangement of claim 1, wherein the guide device comprises at least one guide rail extending in the direction of adjustment.

24. The armrest arrangement of claim 23, wherein the guide device comprises two guide rails extending respectively in the direction of adjustment and spaced apart from one another transversely to the direction of adjustment.

25. The armrest arrangement of claim 1, wherein the at least one slide includes just one slide which movably engages in the guide device in the direction of adjustment.

26. The armrest arrangement of claim 1, comprising another slide spaced apart from the at least one slide transversely to the direction of adjustment and wherein the two slides movably engage in the guide device respectively in the direction of adjustment.

27. The armrest arrangement of claim 1, further comprising another coupling element spaced apart from the at least one coupling element transversely to the direction of adjustment and wherein the two coupling elements respectively couple the armrest to the at least one slide.

28. The armrest arrangement of claim 1, wherein a longitudinal slot in the door lining is associated with the at least one coupling element penetrating the door lining, wherein the coupling element is displaceable in the longitudinal slot in the direction of adjustment.

29. The armrest arrangement of claim 28, wherein a cover plate is arranged on the coupling element, wherein the cover plate is configured to at least partially cover the longitudinal slot from one side.

30. The armrest arrangement of claim 1, wherein the locking mechanism is pretensioned in the direction of a locked state with a resilient element.

31. The armrest arrangement of claim 1, wherein the locking mechanism is held in a locked state by one of gravity and a manually actuatable locking part.

32. The armrest arrangement of claim 1, wherein the locking mechanism comprises a plurality of locking points arranged one after the other in the direction of adjustment of the armrest, and wherein at least one locking element movable together with the armrest is engaged in a locked state with a portion of the locking points.

33. The armrest arrangement of claim 32, wherein the at least one locking element is configured to be disengaged from the associated locking points in the unlocking direction.

34. The armrest arrangement of claim 32, wherein the locking points are configured as positive connection points.

35. The armrest arrangement of claim 1, wherein the guide device is arranged on a supporting door assembly of the motor vehicle door.

* * * * *